United States Patent [19]

Lindsay

[11] Patent Number: 4,732,357

[45] Date of Patent: Mar. 22, 1988

[54] LIGHTWEIGHT TILT MOUNTING HEADS

[75] Inventor: Richard A. Lindsay, Eye, England

[73] Assignee: W. Vinten Limited, England

[21] Appl. No.: 851,492

[22] Filed: Apr. 14, 1986

[30] Foreign Application Priority Data

Apr. 1, 1986 [GB] United Kingdom ............... 8607991

[51] Int. Cl.⁴ .......................................... F16M 11/10
[52] U.S. Cl. .................................... 248/185; 248/577
[58] Field of Search ............... 248/575, 576, 577, 578, 248/582, 584, 592, 593, 594, 130, 371, 178, 183, 185; 108/1, 8; 312/20

[56] References Cited

U.S. PATENT DOCUMENTS

| | | | |
|---|---|---|---|
| 1,126,720 | 2/1915 | Debrie | 248/183 |
| 1,893,929 | 1/1933 | Bolens | 248/577 |
| 3,516,636 | 6/1970 | Burke | 248/578 |
| 4,113,215 | 9/1978 | Stapleton . | |
| 4,129,280 | 12/1978 | Ruegg . | |
| 4,478,382 | 10/1984 | Carrier . | |
| 4,560,129 | 12/1985 | Clayton . | |
| 4,621,782 | 11/1986 | Carlson . | |

FOREIGN PATENT DOCUMENTS

| | | | |
|---|---|---|---|
| 1219192 | 6/1966 | Fed. Rep. of Germany | 248/185 |
| 770635 | 9/1934 | France | 248/185 |
| 140943 | 8/1982 | Japan | 248/371 |
| 73641 | 4/1984 | Japan | 248/584 |
| 7603542 | 11/1976 | Netherlands | 248/185 |
| 8101872 | 7/1981 | PCT Int'l Appl. | 248/185 |
| 677930 | 8/1952 | United Kingdom | 248/185 |
| 807555 | 1/1959 | United Kingdom | 248/183 |
| 1330491 | 9/1973 | United Kingdom | 248/185 |
| 2096345 | 10/1982 | United Kingdom . | |

Primary Examiner—J. Franklin Foss
Assistant Examiner—Robert A. Olson
Attorney, Agent, or Firm—Larson and Taylor

[57] ABSTRACT

A lightweight tilt mounting head, for such as television cameras or the like, having reactionary moment producing means to provide moments equal to the out of balance moments produced as the C of G of an article mounted on the head is rotated about the vertical.

3 Claims, 2 Drawing Figures

LIGHTWEIGHT TILT MOUNTING HEADS

This invention relates to tiltable mountings, and more particularly, though not exclusively, to tilting mountings for supporting articles such as television cinematograph or electronic news gathering cameras in such a manner that the articles may be smoothly and easily tilted, i.e. the extremities of the article in a longitudinal plane change their angle of elevation relative to the C of G; i.e. centre of gravity; of the article. A camera panning head has the further function of permitting a camera to be panned i.e. turned to and fro, or rotated about, a vertical axis. Hereinafter the invention is described with reference to a camera, but it will be understood that other articles may be mounted on such tilting mountings.

Our G.B. Pat. No. 2096345 discloses a method and apparatus producing such a tiltable mounting and this application discloses a method and apparatus producing such a tiltable mounting in a simplified and more easily manufactured form. The tiltable mounting of this application may also be more compact and have a higher load/weight ratio.

Referring to G.B. Pat. No. 2096345 Page 2 lines 24–39 the energy stored in the spring is given as $Ka^2(1-\cos\theta_s)$ where "a" is the lengths of links AC and CD. In this application if AC and CD are made unequal e.g. "a" and "b", then the energy stored in the spring for angle ACD changing from 0 to $B_s$ is Energy stored $= Kab(1 - \cos\theta_s)$ and the amount of compensation to obtain counterbalance may be varied by adjusting dimensions "a" or "b" or by changing the rate of the spring or any combination thereof. By permitting "a" and/or "b" to be variable a simplified structure may be manufactured.

According to the invention we provide a tiltable mounting comprising a base, a tiltable support member pivoted thereto and reactionary moment producing means located between and operated from said base and tiltable support member to produce a reaction equal to the out of balance moment generated by the weight of an article mounted on said tiltable support member as said C of G moves about the vertical.

According to a further aspect of the invention we provide a tiltable mounting comprising a base, a tiltable support member pivoted thereto, mounting means on said tiltable support member for crankedly locating a pivotable slide means, mounting means on said base for pivotably locating a spring guide means having a spring compression means thereon, and a spring located on said spring guide means compressible between said slide means and said spring compression means wherein the reactionary moment at the tiltable support member produced by the action of the pivotable slide means and spring combined is equal to the out of balance moments produced as the C of G of an article mounted on said tiltable support member rotates about the vertical.

According to a still further aspect of the invention we provide a tiltable mounting comprising a base, a tiltable support member pivoted thereto, mounting means on said base for pivotably locating a slide means, mounting means on said tiltable support member for crankedly locating a pivotable spring guide means having a spring compression means thereon, and a spring located on said spring guide means compressible between said slide means and said spring compression means wherein the reactionary moment at the tiltable support member produced by the action of the pivotable slide means and spring combined is equal to the out of balance moments produced as the C of G of an article mounted on said tiltable support member rotates about the vertical.

The invention will now be described, by way of examples only, in conjunction with the accompanying diagrams in which.

Figure 1:
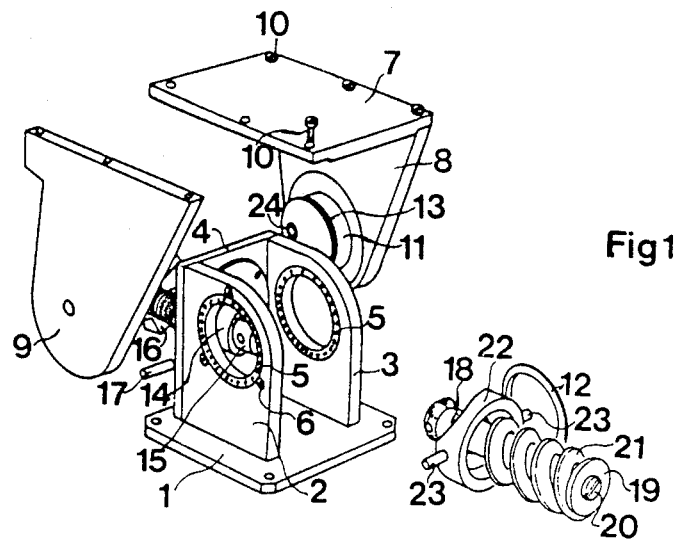
FIG. 1 shows a first embodiment according to the invention.

Referring now to FIG. 1, a base (1) has two spaced apart parallel vertical side plates (2) and (3) mounted thereon. The side plates may be an integral part of the base or may conveniently be separate plates fixed thereto. A stiffener plate (4) may be suitably fixed to both plates and base to provide rigidity and maintain the side plates parallel. Concentric holes, one in each side plate provide a location for a roller bearing or ballrace (5) which may abut a shoulder on the inside face of each side plate and be retained by such as screws (6). A platform (7) and two side plates (8) and (9) may be constructed in a similar fashion to the base to form a tiltable support member. The side plates may be fixed to the platform by such as screws (10). A boss (11) which may be manufactured as a separate item and fixed to the side plate, or may be an integral part thereof, locates in its respective bearing (5) to form the pivot points for the tiltable support member with the base (1) and may be retained in position by fitting such as a snap ring (12) into a peripheral groove (13) machined in each of the bosses (11).

Located in the stiffener plate (4) is a counter bored boss (14) for reception of a bifurcated sleeve (15) and a threaded adjusting screw (16) so that as adjusting screw (16) is rotated the bifurcated sleeve (15) extends or retracts in boss (14). Pivotally located in the bifurcated sleeve (15) and retained therein by such as a pin (17) is a spring guide means (18) having a spring compression means (19), which may be a washer retained by such as a screw (20). A spring (21) located about the spring guide means (18) is compressible between said spring compression means (19) and a pivotable slide means (22) pivotably located on pivot (23) in an offset bearing (24) in each of the bosses (11) to form two oppositely cranked arms so that as the tiltable support member is rotated each side of the vertical the pivotable slide means (22) moves along the spring guide means (18) to compress spring (21) against spring compression means (19).

The mechanism may be pre-set to accommodate a known load on platform (7) but it is preferable that various loads may be accommodated and to this end rotation of threaded adjuster screw (16) provides a means of pre loading spring (21) to give the tiltable support member a reactionary moment substantially equal to the out of balance moment produced by rotating the C of G (centre of gravity) of an article mounted on the platform about the vertical on the pivots formed by boss (11) on each of the two side plates (8) and (9).

Article mounting means and adjusting means for bringing the C of G of the article and tiltable support member vertically above the pivot for the tiltable support member have not been discussed as these are well known in the art and it is sufficient to say that such a mounting means is required and may be a separate unit attachable to the platform (7) or may be an integral part of platform (7).

Figure 2:
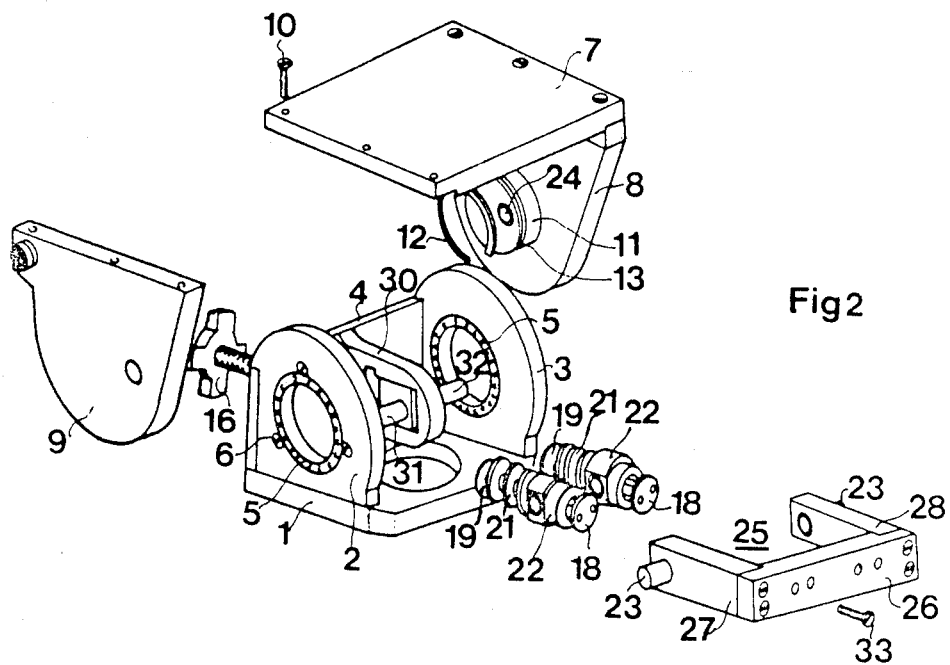
FIG. 2 shows a second embodiment according to the invention.

Referring now to FIG. 2 which shows a second embodiment of the invention wherein the same numerals represent like parts, the base (1), though of slightly different shape, mates with the tiltable support member and may be retained by snap ring (12). In order that maximum spring energy may be available for producing reactionary forces, unlike the spring in FIG. 1, where a pre-load is applied to the spring leaving only the energy of the spring from pre-load onwards to accommodate various loads, the spring or springs of FIG. 2 have been configured in a manner to ensure maximum use of spring energy. A yoke (25) which may be formed from an end plate (26) and two side legs (27) and (28) has a pivot (23) preferably journalled, in each side leg so that the yoke may be crankedly pivotable in bearings (24), one in each boss (11). A protrusion (29), on stiffener plate (4), has cut away sections for receiving adjusting screw (16) and a slide means (30). Pivots (31) and (32), one each side of slide means (30) act as pivot points for pivotable slide means (22). Both spring guide means (18) may be located on the yoke (25) and retained by such as screws (33).

It will be obvious to those skilled in the art that the advantage of these heads over that disclosed and described in Pat. No. 2096345 are numerous e.g. the 2 to 1 ratio is eliminated, one retaining means and one spring compression means become redundant and the unit becomes simpler to manufacture, more compact, easier to adjust and perform spring changes.

I claim as my invention:

1. A tiltable mounting comprising a base, a tiltable support member pivoted thereto and reactionary moment producing means, located between and operated from said base and tiltable support member for producing a reaction equal to the out of balance moment generated by the weight of an article mounted on said tiltable support member as the center of gravity of the article moves about the vertical, said reactionary moment producing means comprising mounting means on said base for pivotably locating a slide means, mounting means on said tiltable support member for crankedly locating a pivotable spring guide means having a spring compression means thereon, and a spring located on said spring guide means compressible between said slide means and said spring compression means wherein the reactionary moment at the tiltable support member produced by the action of the pivotable slide means and spring combined is equal to the out of balance moments produced as the center of gravity of an article mounted on said tiltable support member rotates about the vertical.

2. A tiltable mounting as claimed in claim 1 wherein said mounting means comprises a protrusion having a cut away section for receiving a slide means and adjusting means therefor.

3. A tiltable mounting as claimed in claim 1 wherein said pivotable spring guide means comprises a yoke, spring guide means mounted therein, pivotable slide means located on said spring guide means, springs located on said spring guide means compressible between said pivotable slide means and spring compression means on said spring guide means.

* * * * *